Patented July 13, 1954

2,683,650

UNITED STATES PATENT OFFICE 2,683,650

SHIELDING WINDOW AGAINST RADIOACTIVITY AND COMPOSITION THEREFOR

William B. Doe, La Grange, Ill., assignor to the United States of America as represented by the United States Atomic Energy Commission No Drawing. Application August 18, 1952,
Serial No. 305,070

4 Claims. (Cl. 23—97)

This invention deals with an improved transparent shielding window against radioactivity, with a composition for such a window and with a process of stabilizing such a composition.

Shielding windows for radioactivity-emitting equipment are usually built of two walls of glass, or other transparent material, between which a liquid is arranged that has a highly absorptive power for gamma rays. Aqueous solutions of zinc bromide have been used successfully as the protective liquid. However, with zinc bromide the disadvantages had been experienced that, after a relatively short time, the liquid became discolored and a precipitate formed, both of which phenomena considerably impaired the transparency of the window. It was first assumed that this deterioration was mainly due to the presence of impurities in the technical grade zinc bromide; however, further studies showed that discoloration, though not precipitation, occurred also when chemically pure zinc bromide was used. This was considered quite a drawback because the windows always had to be refilled after a certain period of use.

It is an object of this invention to devise zinc bromide-containing shielding windows which do not deteriorate, and in particular which do not become discolored under the effect of gamma radiation.

It is another object of this invention to devise zinc bromide-filled shielding windows which do not form a precipitate under the effect of gamma radiation.

It is still another object of this invention to devise zinc bromide-filled shielding windows for which a commercial grade zinc bromide may be used without disadvantage, so that the cost of these windows is relatively low.

It is still another object of this invention to devise zinc bromide-filled shielding windows in which frequent renewal of the zinc bromide is not necessary so that an improvement from the economical point of view is obtained.

A great many substances have been studied for stabilizing the zinc bromide for shielding windows of the type described above. One substance which had shown some beneficial effect is phosphoric acid; phosphoric acid, when used in a concentration of about 2%, prevented discoloration of the zinc bromide; however, precipitation still occurred in such phosphoric acid-containing zinc bromide solutions.

It has now been found that the addition of hydroxylamine hydrochloride to zinc bromide solutions made the latter very stable against the usually harmful effects of gamma rays. The concentration of the hydroxylamine hydrochloride may vary widely. For a radioactivity of one billion roentgens a concentration of about 0.9 M in the zinc bromide solution has been found very satisfactory. Due to the presence of the hydroxylamine hydrochloride, no discoloration or precipitation occurred in the zinc bromide under the influence of gamma radiation, even when a technical grade salt was used.

It will be understood that this invention is not to be limited to the details given herein but that it may be modified within the scope of the appended claims.

What is claimed is:

1. A process of preventing formation of color and precipitates in a zinc bromide solution for shielding windows during gamma radiation, comprising adding hydroxylamine hydrochloride to the solution.

2. The process of claim 1 wherein the hydroxylamine hydrochloride is added in a quantity to obtain a concentration, in the zinc bromide, of about 0.9 M.

3. As a composition of matter, an aqueous solution of zinc bromide containing relatively small amounts of hydroxylamine hydrochloride.

4. The composition of matter of claim 3 wherein hydroxylamine hydrochloride is present in a concentration of about 0.9 M.

References Cited in the file of this patent

UNITED STATES PATENTS

| Number | Name | Date |
|---|---|---|
| 1,894,942 | Chromy | Jan. 24, 1933 |
| 2,223,118 | Miller | Nov. 26, 1940 |

OTHER REFERENCES

Reviews of Modern Physics, vol. 20, Nov. 4, 1948, pages 597–598; "Table of Isotopes" by Seaborg and Perlman.

Mellor, "Comprehensive Treatise on Inorganic and Theoretical Chemistry," vol. 5, pages 380–381, Longmans, Green and Co., 1924, N. Y.